United States Patent
Casagrande Denardin et al.

(10) Patent No.: US 12,517,196 B2
(45) Date of Patent: Jan. 6, 2026

(54) PORTABLE, FIXED EXTERNAL FIELD MAGNETOMETER FOR THE DETECTION OF MAGNETIC SIGNALS FROM SAMPLES AND THE ASSESSMENT OF THE AMOUNT OF MAGNETIC MATERIAL IN THE SAMPLE

(71) Applicants: UNIVERSIDAD DE SANTIAGO DE CHILE, Santiago (CL); UNIVERSIDAD CENTRAL DEL CHILE, Santiago (CL); UNIVERSIDAD AUTONOMA DE CHILE, Santiago (CL)

(72) Inventors: Juliano Casagrande Denardin, Santiago (CL); Dora Rosa Altbir Drullnisky, Santiago (CL); Rafael Melo Freire, Santiago (CL); Joaquin Aldunate Varela, Santiago (CL); Juan Luis Palma Solorza, Santiago (CL); SebastiÆnAlfonso Michea Mora, Santiago (CL)

(73) Assignees: UNIVERSIDAD DE SANTIAGO DE CHILE, Santiago (CL); UNIVERSIDAD CENTRAL DEL CHILE, Santiago (CL); UNIVERSIDAD AUTONOMA DE CHILE, Santiago (CL)

( * ) Notice: Subject to any disclaimer, the term of this patent is extended or adjusted under 35 U.S.C. 154(b) by 0 days.

(21) Appl. No.: 17/758,290

(22) PCT Filed: Dec. 31, 2019

(86) PCT No.: PCT/CL2019/050165
§ 371 (c)(1),
(2) Date: Jun. 30, 2022

(87) PCT Pub. No.: WO2021/134136
PCT Pub. Date: Jul. 8, 2021

(65) Prior Publication Data
US 2023/0041292 A1 Feb. 9, 2023

(51) Int. Cl.
*G01R 33/12* (2006.01)
*G01N 27/72* (2006.01)

(52) U.S. Cl.
CPC ......... *G01R 33/1276* (2013.01); *G01N 27/72* (2013.01); *G01R 33/1215* (2013.01)

(58) Field of Classification Search
CPC ................ G01N 27/72; G01R 33/1276; G01R 33/1215; G01R 33/0035; G01R 33/0017;
(Continued)

(56) References Cited

U.S. PATENT DOCUMENTS

| 5,442,288 A * | 8/1995 | Fenn ...................... G01H 13/00 324/226 |
| 5,506,500 A * | 4/1996 | Krause .................. G01R 33/16 324/201 |
| 2007/0007956 A1* | 1/2007 | Min .................... G01R 33/1223 324/260 |

* cited by examiner

*Primary Examiner* — Jermele M Hollington
*Assistant Examiner* — Taqi R Nasir

(57) ABSTRACT

The present invention relates to a magnetometric device that measures the magnetic properties of a sample and whose most notable characteristic lies in that it is portable and highly precise, and can be used for the detection of a magnetic signal from nanostructures exposed to a fixed external magnetic field of excitation, of a unique value, it not being possible to alter the external magnetic field. The fixed external field can only be altered by modifying the device by means of exchanging the permanent magnets; however, once the device is sealed, this field does not vary. Different quantities of the same magnetic material may be placed in the sample holder, increasing the measurement signal; the present device can therefore determine the magnetic mass (Continued)

being measured following calibration of the magnetic material employed.

13 Claims, 5 Drawing Sheets

(58) Field of Classification Search
CPC .. G01R 33/34061; G01B 7/004; G01C 17/38; G06F 3/017; G06F 3/0346; G06F 3/012; A61B 34/20; A61B 2034/2051; G02B 27/017

See application file for complete search history.

PORTABLE, FIXED EXTERNAL FIELD MAGNETOMETER FOR THE DETECTION OF MAGNETIC SIGNALS FROM SAMPLES AND THE ASSESSMENT OF THE AMOUNT OF MAGNETIC MATERIAL IN THE SAMPLE

FIELD OF THE APPLICATION

The present invention relates generally to the area of physics. In particular, the invention relates to devices that allow the application of a magnetic field and thus, the measurement of the magnetization effect of any element when applying said field on this element. This device can be used to measure any magnetic sample, specifically, in this case it was designed to detect magnetic nanoparticles (superparamagnetic or anhysteretic).

BACKGROUND

Various methodologies and techniques are known for measuring the magnetization of a sample, where the variation of magnetic flux is used to produce a measurable signal. Among the techniques that can be named are the vibrating sample magnetometer (known by its acronym VSM, vibrating sample magnetometer) which, by means of a vibration applied to the magnetic sample, which is immersed in a fixed magnetic field applied, there is a variation in the applied external fixed field. Said variation of the applied fixed external magnetic field produces a variation in a pair of receiver coils which produce a measurable electrical signal, where this signal is proportional to the set of chain effects that has just been described. Which finally leads us to the fact that the electrical signal that is measured from the receiving coils is proportional to the magnetization of the sample. On the other hand, there is also the Alternating Gradient Force Magnetometer (AGFM), where by applying an external alternating magnetic field to the sample, which is in a region of fixed field external applied, a movement of the sample is generated. It is the same effect previously described, but this time the sample is not moved to generate a signal, but a signal is generated to move the sample.

The device of the present invention, a magnetometer, essentially comprises a compartment that houses two magnets that attract each other, that is, that are arranged with opposite poles facing each other. This last fact generates a constant magnetic field in a cavity located just in the middle of the compartment. In said cavity at least two magnetic field inducing means are located, preferably, cylindrical coils composed of a non-magnetic metal wire, specifically copper of 0.15 mm in diameter, the material being able to vary, including a non-ferromagnetic conducting material, being able also vary the range of wire dimensions from 0.01 mm to 10 mm in diameter, the shape of the coil may also vary (circular, tubular, square, among others), and it may also be selected from a flat micro-coil designed by lithograph on a flat substrate.

In the center of said coil, described in the previous paragraph, there is a cavity that is circular when the coil is a cylindrical coil. This cavity can vary considering the various coil geometries described in the previous paragraph, being able to be a cavity with a cross section of a square, triangular or other geometric shape, and tubular through its axial axis. Without conflict with this, this cavity must be filled with a ferromagnetic material, or it can be filled with ferrimagnetic material, or another material of high permeability which allows the conduction of the external magnetic field lines.

The sample is held by a stem, which can be made of any rigid, non-ferromagnetic or rigid non-ferromagnetic material. Said stem can be solid or hollow, having a tubular geometry with a cross section of any geometry (square, triangular, circular, among others) by way of example, and not limitingly the embodiment of the invention preferably uses a circular section in the stem cross section geometry. At one end of the stem a small, preferably square platform is placed, which can vary in dimension in the range of 1 mm on each side to 1 cm on each side. This platform can have any flat geometric shape. The opposite side of the stem is attached to a piezoelectric material, rectangular in cross section and long on its axial axis. The main characteristic of this material, ceramic, is that, when undergoing a deflection-type deformation, that is, buckling of its axial axis, this piezoelectric material produces a measurable electrical signal which is in the mV range. The magnetic sample that will be subjected to a movement by means of the alternating field produced by the coils is anchored in the piezoelectric sensor producing a potential difference in the terminals of this piezoelectric, a potential difference that is proportional to the magnetization of the sample measured by a data acquisition system. In the example of the invention, this technique is used-non-limitingly, within a compartment with a fixed external field applied to produce a single deflection in the piezoelectric which will correspond to a single signal related to a single magnetization level of the measured sample. This variation of the measured sample can come from the type of material that is being measured, that is, sample material, or it can come from the amount of material that is being measured, that is, from the amount of the sample.

It is possible to cite from prior art WO2016164247A1 (Verily Life Sciences LLC) which discloses portable devices configured to detect the presence, concentration, number or other properties of magnetic nanoparticles arranged in the vasculature of the subsoil of a person. Portable devices are configured to detect, using one or more magnetometers, magnetic fields produced by the magnetic nanoparticles. In some embodiments, the magnetometers are atomic magnetometers. In some embodiments, the wearable devices include magnets or other means to magnetize the magnetic nanoparticles. In some embodiments, the portable devices produce a time-varying magnetic field, and the magnetometers are configured to detect a time-varying magnetic field sensitively produced by the magnetic nanoparticles. In some embodiments, the magnetic nanoparticles are configured to bind an analyte of interest and the detected properties of the magnetic nanoparticles can be used to determine the presence, concentration, or other properties of the analyte. Detection of magnetic fields produced by magnetic nanoparticles can include detection of the fields directly or indirectly.

US20120022792A1 (National Council for Scientific and Technical Research (CONICET) and National Atomic Energy Commission (CNEA)) discloses a method for quantifying the absorption of magnetic nanoparticles in animal tissues that includes the determination of the number of magnetic nanoparticles absorbed in animal tissues by magnetization measurements. The method is based on the measurement of the magnetization versus the applied magnetic field of the tissue sample absorbed with the nanoparticles, obtaining its saturation magnetization. This magnitude is compared with the saturation magnetization of the same nanoparticles found in the tissue to determine the absolute number of magnetic nanoparticles in the animal tissue studied. The method includes preparing the samples for the sample holder, measuring the magnetization against the applied magnetic field of a known number of magnetic nanoparticles. Unlike the present device or magnetometer, this device is not portable, and does not require a Loock-in signal amplifier, nor a power supply on the order of kV (kilo-volts). Neither of inductive coils of a fixed external magnetic field, which house a large space only available in the laboratory. The great weight of the equipment described above makes it unportable, unlike the device of the present invention, which is totally transportable.

WO2011053435A1 (Scientific Nanomedicine Inc) provides methods and apparatus for detecting or measuring cells or substances present in biological samples. The method comprises (a) providing targeted nanoparticles that make up a magnetic nanoparticle conjugated with a targeting agent that preferentially binds to cells of a first type, (b) introducing the targeted nanoparticles to the sample in a manner that allows the binding of the Cell targeting agents of the first type, (c) subjecting the bound target nanoparticles to the operation of a magnetic device to extract the sample cells to which the target nanoparticles are bound. The method can also comprise (a) preparing a second sample by combining a first sample with a plurality of specific nanoparticles, (b) subjecting the second sample to an applied magnetic field, and (c) measuring the relaxation of the magnetic field induced in the nanoparticles linked to determine the presence, concentration, or other characteristic of cells of the predetermined type. Unlike the device or magnetometer of the present invention, this prior art device is not portable, and does not require a Loock-in signal amplifier, nor does it require a power supply on the order of kV (kilo-volts). It also does not require induction coils of a fixed external magnetic field, which house a large space only available in the laboratory. The great weight of the equipment described above makes it unportable, unlike the present device or magnetometer, which is totally transportable.

US20110059444A1 discloses a detection or quantification method for biological entities or molecules such as, but not limited to, DNA, microorganisms and pathogens, proteins and antibodies, which by themselves are target molecules or from which target molecules are extracted, comprises the steps of i) forming target molecule-dependent volume-amplified entities, ii) allowing magnetic nanoparticles to bind to said volume-amplified entities, and iii) measuring changes in the magnetic dynamic response of magnetic nanoparticles caused by increasing volume hydrodynamics of said magnetic nanoparticles or measure the magnetic field due to the magnetic nanoparticles, as they are attached to a functionalized sensor surface with a secondary capture probe. The biosensors and kits are adapted for use in such a method. Unlike the present device, the prior art magnetometer is not portable, and does not require a Loock-in signal amplifier, nor does it require a power supply on the order of kV (kilo-volts). It also does not require induction coils of a fixed external magnetic field, which house a large space only available in the laboratory, nor does it require measurement of hydrodynamic volume. The great weight of the equipment described above makes it non-transportable, unlike the present device or magnetometer, which is totally transportable.

U.S. Pat. No. 8,447,379B2 (Imagion Biosystems Inc) discloses a method to determine the presence, location, quantity or a combination thereof, of a biological substance, which comprises: (a) exposing a sample to a plurality of specific nanoparticles, where each specific nanoparticle comprises a paramagnetic nanoparticle conjugated to one or more targeting agents that preferentially bind to the biological substance, under conditions that facilitate the attachment of the targeting agent to at least one of the one or more biological substances; (b) subjecting the sample to a magnetic field of sufficient force to induce the magnetization of the nanoparticles; (c) measuring a magnetic field of the sample after decreasing the applied magnetic field in step b below a threshold; (d) determine the presence, location, quantity or a combination thereof. The point (b) just named, is what is commonly done today in laboratories with large equipment (not portable that can hold 4 m2 of surface) and heavy (of the order of 100 Kg). It is at this point that our equipment is portable (on the order of 1000 cm3) and with a low weight (on the order of 1 Kg). Compared with the present device or magnetometer, the latter has the characteristic of being portable, and serves to assist in the measurement of the alternating field gradient once the fixed external magnetic field has been applied to the sample.

BRIEF DESCRIPTION OF THE INVENTION

The system of the present invention is shown in FIG. 1, FIG. 2, FIG. 3, FIG. 4 and FIG. 5. The system is an alternating force gradient magnetometer that allows knowing the magnetization of a sample to a certain applied field value, applied field value that remains fixed. The system includes a sample holder where the plate containing the magnetic material will be located. The sample holder is anchored by a rigid stem to a piezoelectric. The piezoelectric produces an electrical signal as it undergoes deformation, deflection or buckling in the main axis of the piezoelectric. The system has at least one pair of coils that generate the alternating gradient field (AGF); at least one pair of permanent magnets (FIG. 1 (6)), which give the fixed external magnetic field value applied to the sample (FIG. 1 (1)); at least one sensor based on a piezoelectric (FIG. 1 (3)).

DETAILED DESCRIPTION OF THE INVENTION

The present portable magnetometry device is reliable and accurate, and allows detecting the presence of magnetic materials on a thin surface, whether this surface is organic (polyethylene, cellulose, among others) or inorganic (metals, oxides, among others). For the measurement, the portable fixed field magnetometry device comprises a magnetic system of magnetic means, preferably permanent magnets (FIG. 1 (6)) and an alternating field gradient system by means of at least two magnetic field inducing means, preferably, coils that apply an alternating variable field, an applied field which will move the sample from its equilibrium position to produce a deflection in the piezoelectric sensor (FIG. 1 (9)). In order to manipulate the sample, a mechanical system will be used which is mobile and allows the arm with the piezoelectric to be moved away from the fixed system of coils with the permanent magnets.

Figure 1A:
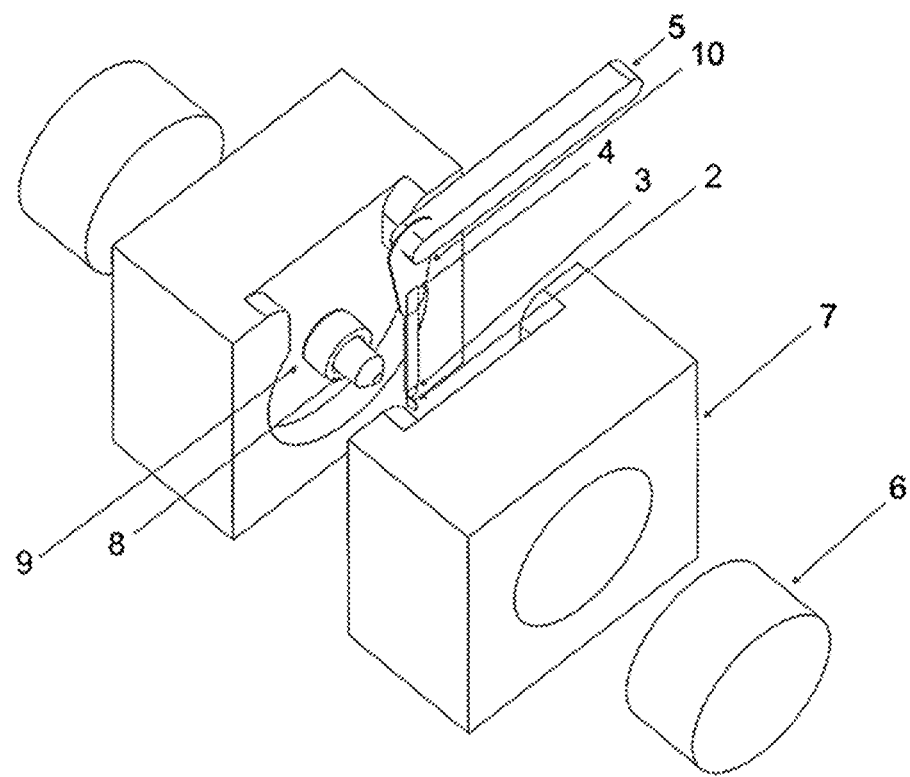
FIGS. 1A and 1B. Isometric views of the components of the portable magnetometer. Schematic description of the main components of the present AGFM alternating gradient magnetometry device. (1) sample holder, (2) rigid stem, (3) piezoelectric, (4) electrical signal output (+, −) of the piezoelectric, (5) arm support that is connected to a positioning motor, (6) magnet, permanent magnet, (7) fixed field electromagnet bracket, (8) coil core, (9) variable field inductor coils, (10) piezoelectric bracket.
Figure 1B:
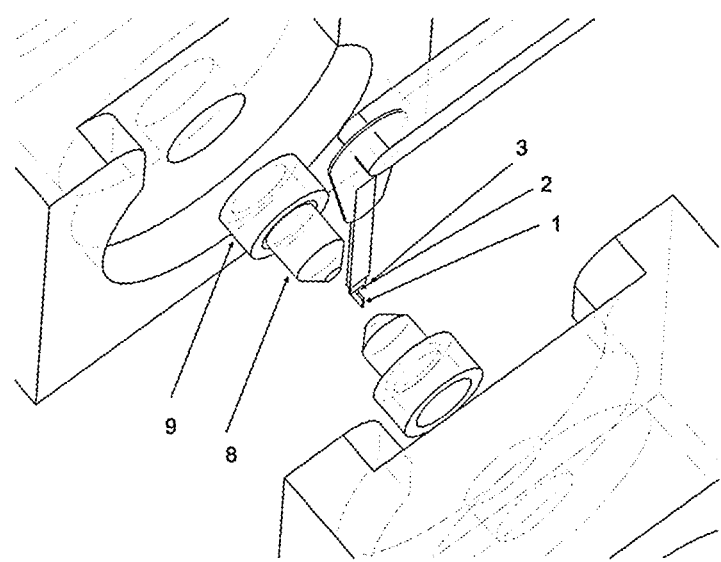
Figure 2A:
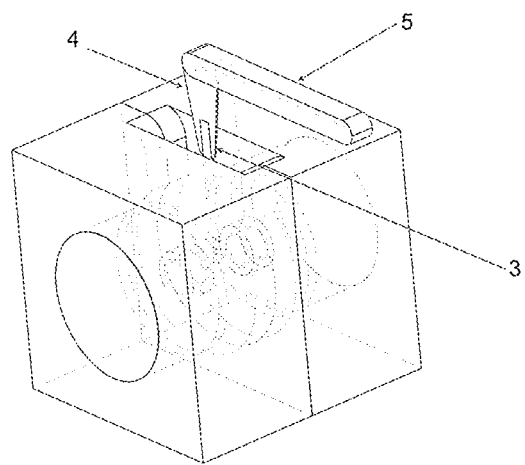
FIGS. 2A and 2B. Isometric views of the assembled portable magnetometer. Description of the sealed magnetometer, that is, assembled. (1) sample holder, (2) rigid stem, (3) piezoelectric, (4) electrical signal output (+, −) of the piezoelectric, (5) arm support that is connected to a positioning motor, (8) coils core, (9) variable field inductor coils.
Figure 2B:
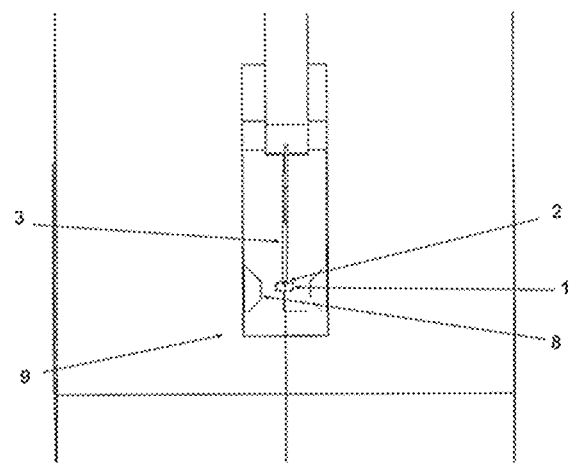
Figure 3:
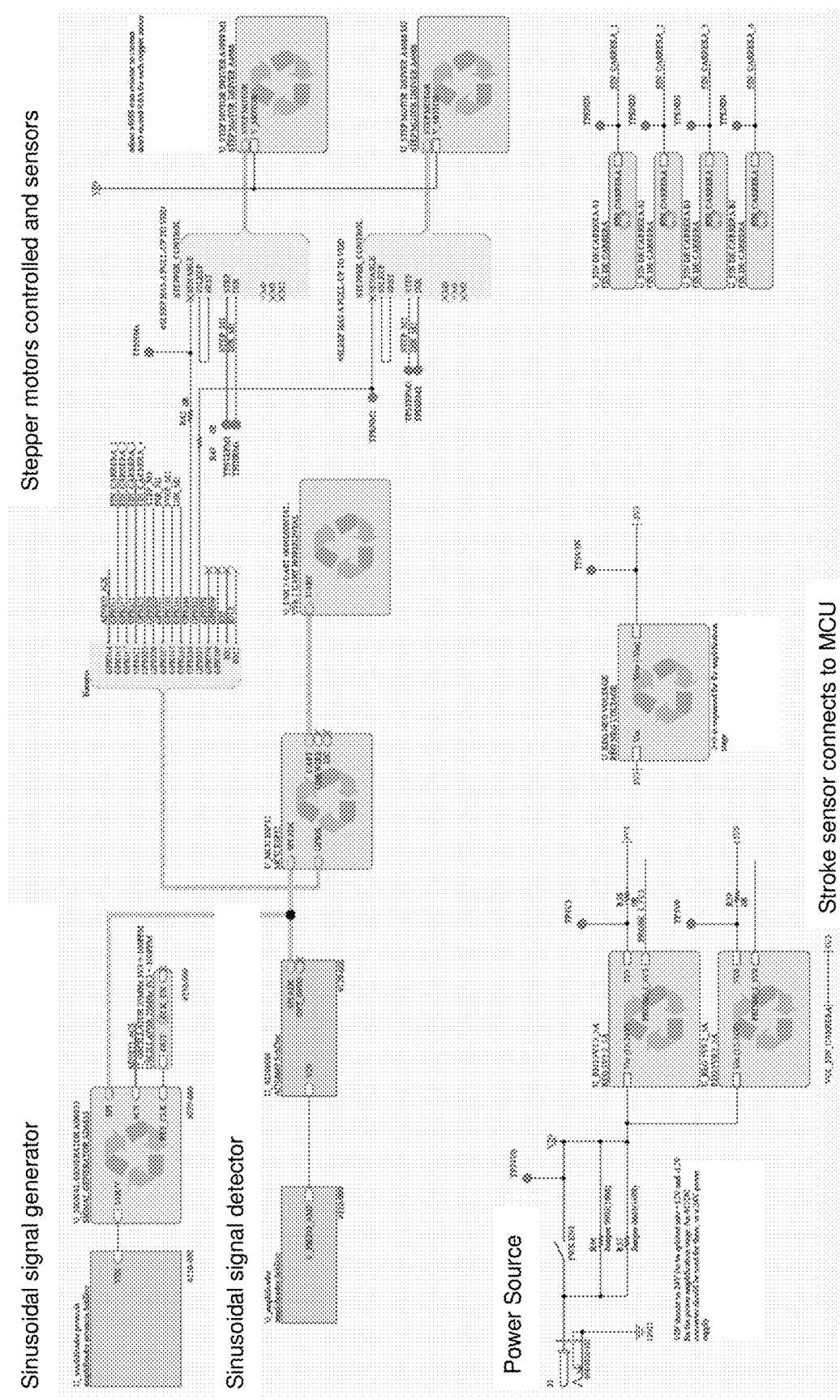
FIG. 3. Schematic flow diagram of the stages of the portable magnetometer controller circuit. Schematic flow diagram of the controller circuit stages of the portable fixed external applied field magnetometer for detecting magnetic signals from samples and evaluating the amount of magnetic material in a sample. (1) The sinusoidal signal generator. (2) Sinusoidal Signal Detector. (3) Stepper motors controlled and sensors (4) Power Source.
Figure 4:
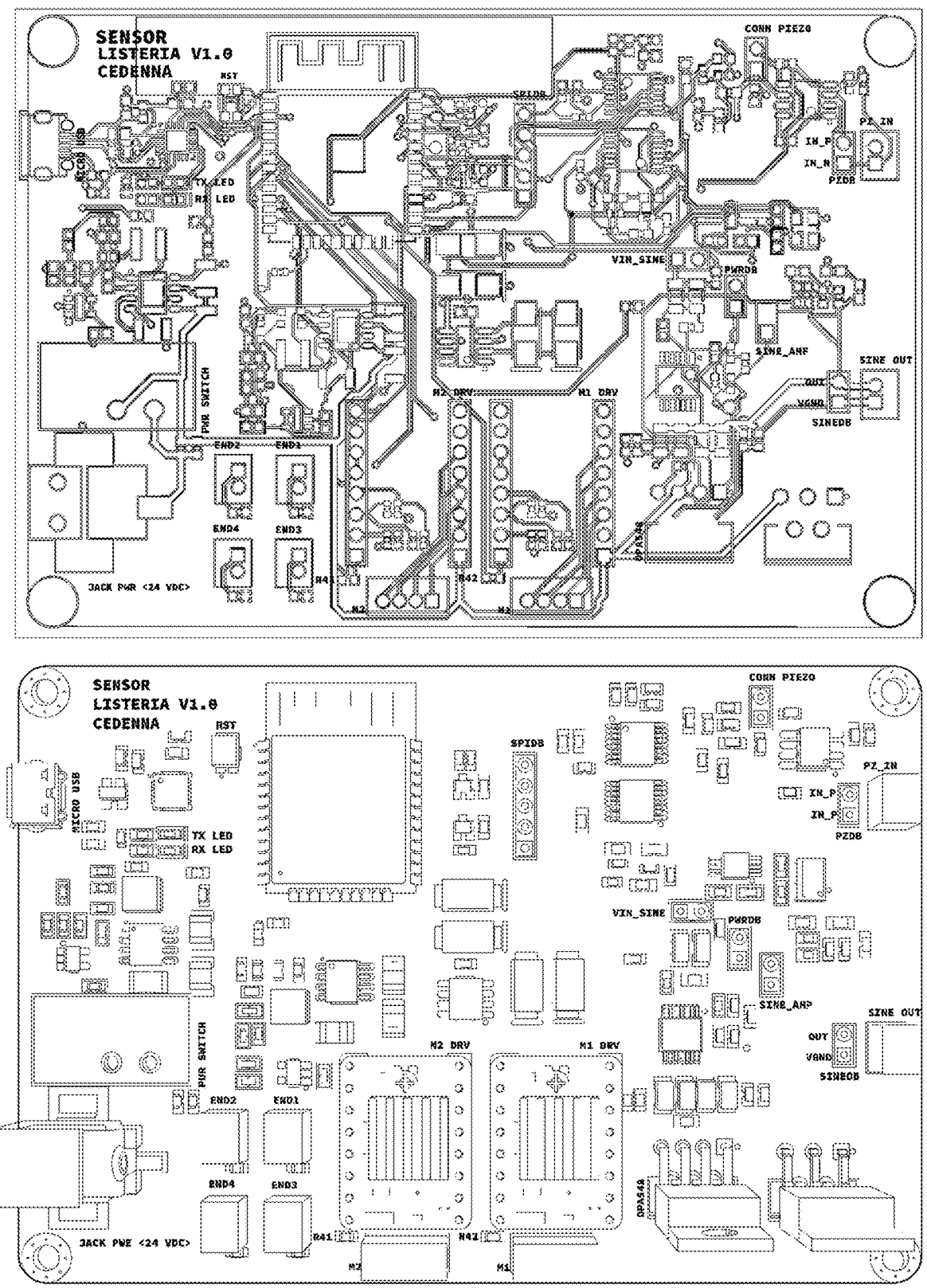
FIG. 4. Distribution of the electronic components of the circuit. Distribution of the electronic components of the circuit, that is, printed board.
Figure 5:
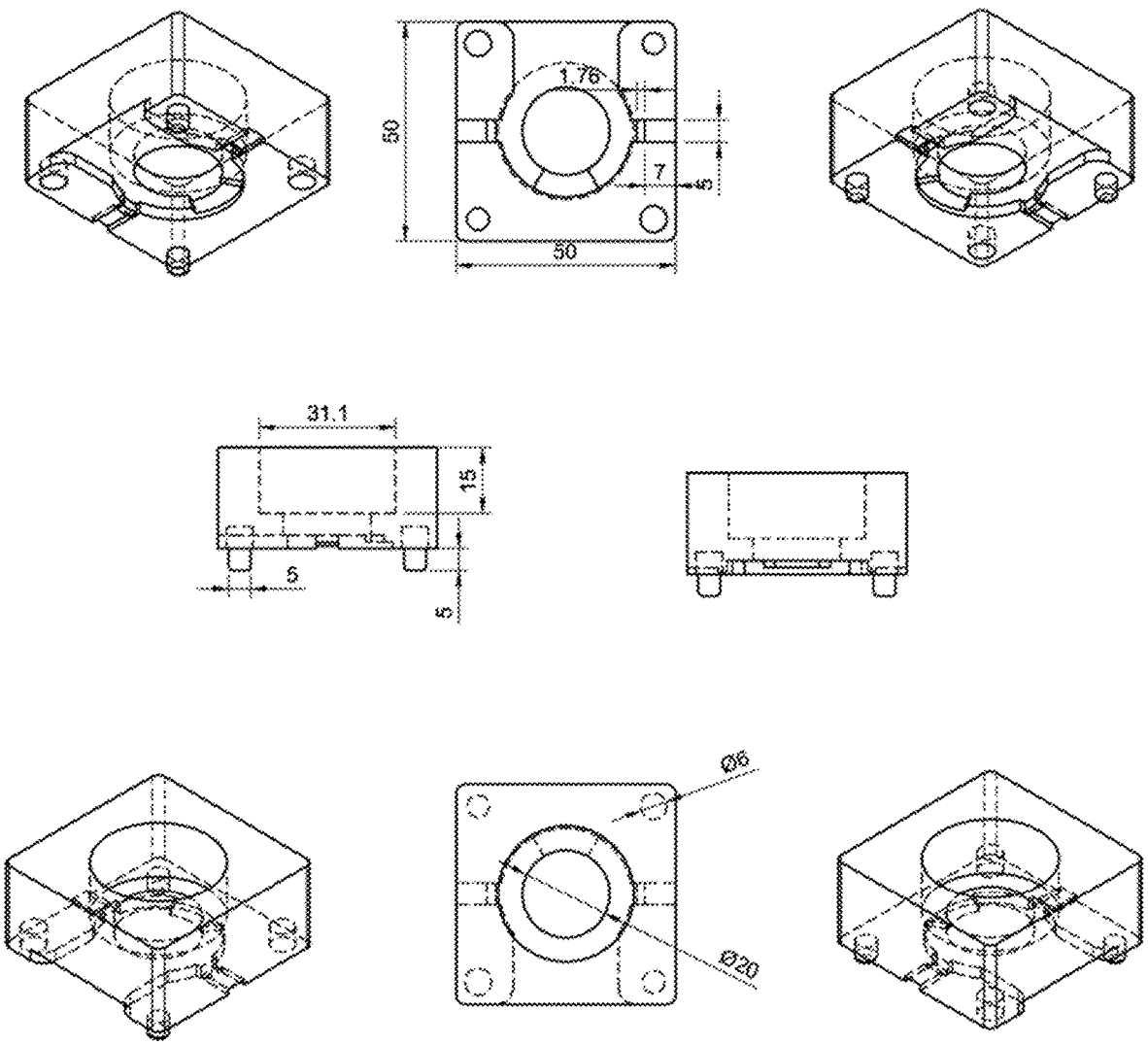
FIG. 5. 3D model plan for the electromagnet support. 3D model plan for electromagnet support, i.e. permanent magnet support, coil support, coil core support and their respective spatial configurations.

The mechanical system comprises a mechanical arm coupled (FIG. 1 (5)) to a step motor, which rotates the arm to remove the sample holder from the electromagnet cavity, thus mounting the magnetic sample, that is, the specimen to be measured, and then the stepping motor turns again, but this time in the opposite direction to put the sample holder back into the electromagnet cavity. The step motor is controlled by a controller circuit shown in FIG. 3. The controls are programmed into the microprocessor through c++ language.

The sample is mounted on a sample holder, which in turn is anchored to a rigid and light stem, made of non-magnetic material, preferably acrylic. In turn, the stem is attached to the piezoelectric that is composed of ceramic material, which produces an electrical signal at the time of deformation, deflection or buckling in the axial axis of the piezoelectric.

Being subjected to a fixed external field the sample is magnetized, in this case the fixed external magnetic field is produced by a permanent magnet, preferably at least two permanent magnets arranged with opposite poles facing the cavity of the electromagnet. As the sample is magnetized, it is susceptible to changes in the magnetic field applied by the inductor coils of an alternating gradient field. This alternating gradient field is driven by a core of ferromagnetic or ferrimagnetic material, specifically in this case a ferromagnetic iron core was used. The signal emission means are associated with the generation of the alternating magnetic field AGF produced by said coils, for this, a sinusoidal signal with a frequency between 10 Hz and 10 KHz is applied that is associated with the mass of the sample and a current capable of generating a field of magnitude that can vary from 10 to 100 Oe.

Due to the application of this disturbance in the magnetic field applied to the sample, the sample itself is subjected to a force that forces it to move, so the movement propagates through the rigid stem to the piezoelectric, which in turn, it will deform due to the transmission of this movement. In this way, the piezoelectric will deform, generating a signal proportional to this deformation, and therefore proportional to the magnetization of the sample.

In summary, the present magnetometry device comprises a signal generator module, a motor module, control means and sensor means, and a power supply and amplification module. In addition to signal generators, microcontrollers, programmable pin, amplifiers, motor controllers and electronic distribution on a printed board.

The invention claimed is:

1. A portable magnetometry device configured to detect the presence of magnetic materials on surfaces of thin organic and inorganic samples, comprising:
    a magnetic system including
        at least two magnetic field generating means, and
        an alternating field gradient system; and
    a mechanical system including
        an arm configured to hold a thin organic or inorganic sample, and
        a piezoelectric sensor attached to the arm
    wherein application of a variable field moves the sample being held by the arm away from an equilibrium position in the alternating field gradient system producing a deflection in the piezoelectric sensor;
    a signal generator module configured to generate signals for a magnetic system or a field gradient system;
    a motor module including a control means and a sensor means;
    a power supply connected to the signal generator and the motor module;
    an amplification module connected to the signal generator; and
    one or more microcontrollers configured to control the signal generator and the motor module.

2. The portable magnetometry device of claim 1 wherein said mechanical system wherein
    the arm is coupled to a motor and
    the arm rotates in a first direction to remove the sample from an electromagnet cavity, and
    rotates in a second direction to move the sample into the electromagnet cavity.

3. The portable magnetometry device of claim 1 wherein said motor is a stepping motor, and said stepping motor is controlled by a driver circuit.

4. The portable magnetometry device of claim 1 wherein said sample holder arm is anchored to a rigid and lightweight stem, and wherein said rigid and lightweight stem comprises non-magnetic material.

5. The portable magnetometry device of claim 4 wherein said stem is adhered to said piezoelectric sensor.

6. The portable magnetometry device of claim 1 wherein said at least two permanent magnets are arranged with opposite poles facing the cavity of the electromagnet.

7. The portable magnetometry device of claim 4 wherein the non-magnetic material is an acrylic material.

8. The portable magnetometry device of claim 5, wherein the piezoelectric sensor comprises a ceramic material.

9. The portable magnetometry device of claim 8, wherein the piezoelectric sensor produces an electrical signal at the time of deformation, deflection or buckling in the axial axis of the piezoelectric.

10. The portable magnetometry device of claim 1 wherein the device is configured to detect the presence of magnetic materials on thin organic surfaces comprising polyethylene or cellulose.

11. The portable magnetometry device of claim 1 wherein the device is configured to detect the presence of magnetic materials on thin inorganic surfaces comprising metals and metal oxides.

12. The portable magnetometry device of claim 1 wherein the at least two magnetic field generating means include two permanent magnets.

13. The portable magnetometry device of claim 1 wherein the alternating field gradient system includes at least two magnetic field inducing coils.

* * * * *